G. GOMAND.
BALANCED DISTRIBUTER FOR HYDRAULIC MACHINES.
APPLICATION FILED MAR. 26, 1917.
1,294,650.
Patented Feb. 18, 1919.
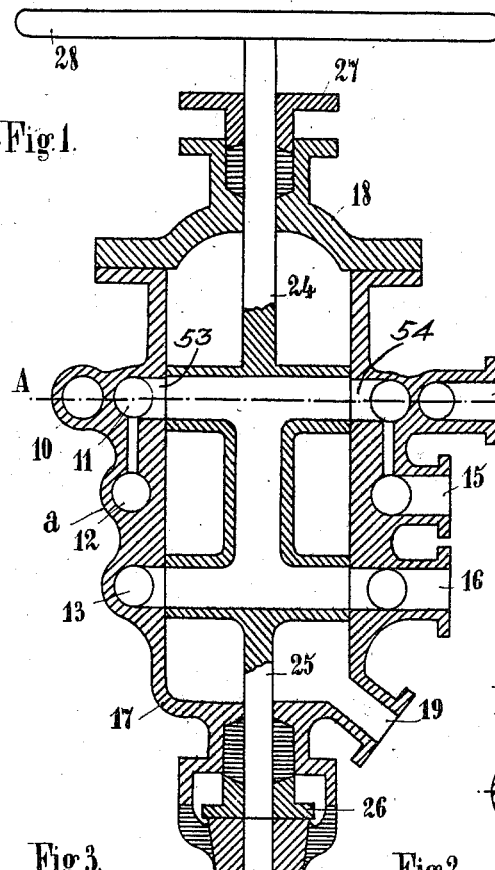
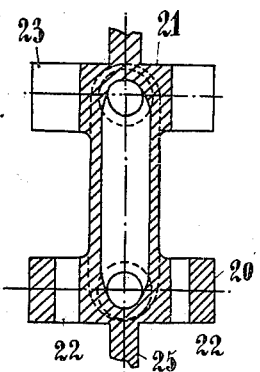
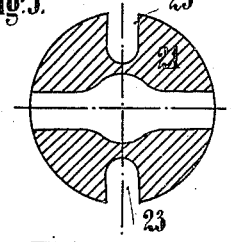
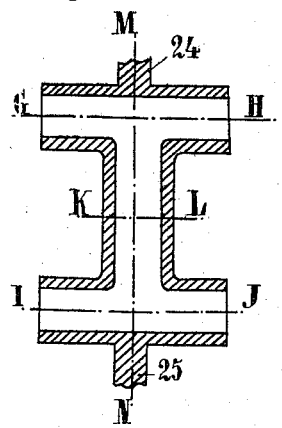
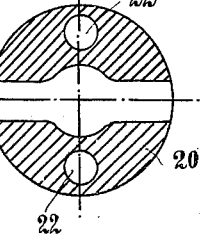
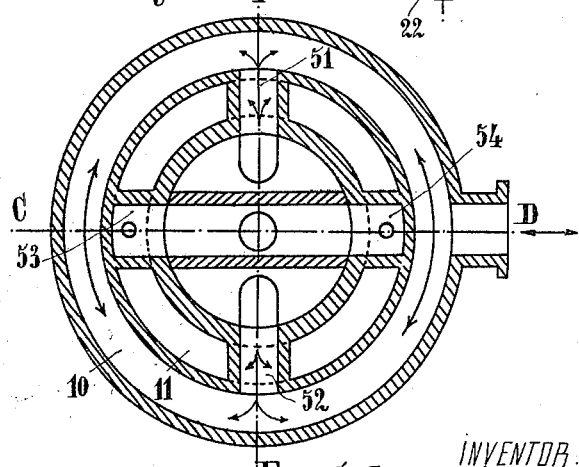
INVENTOR.
Gabriel Gomand
BY
ATTORNEY.

UNITED STATES PATENT OFFICE.

GABRIEL GOMAND, OF BARCELONA, SPAIN.

BALANCED DISTRIBUTER FOR HYDRAULIC MACHINES.

1,294,650.  Specification of Letters Patent.  Patented Feb. 18, 1919.

Application filed March 26, 1917. Serial No. 157,583.

*To all whom it may concern:*

Be it known that I, GABRIEL GOMAND, a citizen of the Republic of France, residing at Barcelona, Spain, have invented certain new and useful Improvements in Balanced Distributers for Hydraulic Machines, of which the following is a specification.

This invention relates to a balanced distributer with direct passages, for hydraulic machines: such as presses, hammers, etc., but also applicable to any hydraulic machine working at a high pressure.

A construction of the distributer is illustrated by way of example in the accompanying drawing.

Figure 1 is a section on line C—D of Fig. 2.

Fig. 2 is a section on line A—B of Fig. 1.

Fig. 3 is a longitudinal section of the valve.

Fig. 4 is a section on line M—N of Fig. 3.

Fig. 5 is a section on line G—H of Fig. 3.

Fig. 6 is a section on line K—L of Fig. 3.

Fig. 7 is a section on line I—J of Fig. 3.

The distributer is constituted by a cylinder *a* provided with four circular conduits 10, 11, 12 and 13. The two upper conduits 10 and 11 are disposed concentrically and co-planar with each other, and the inner conduit 11 is divided into four compartments 51, 52, 53, 54 (see Fig. 2); these four compartments communicate with the interior of the cylinder. Moreover, the two compartments 51 and 52 arranged opposite for obtaining equilibrium, are in communication with the outer circular conduit 10, and the other two opposite compartments, 53 and 54, are in communication through vertical conduits with the intermediate conduit 12. The conduit 10 is in communication with the upper portion of the cylinder of the hydraulic press through the branch 14. The intermediate conduit 12 is in communication with the lower portion of the cylinder of the hydraulic press through the branch 15. The lower conduit 13, in communication with the interior of the cylinder of the distributer, is also in communication with the suction side of the pump through the branch 16.

The cylinder of the distributer is closed at one end by a cover 17 cast with it.

The opposite end of the cylinder is closed by a detachable cover 18 in order to enable the valve to be fitted.

Water under pressure is admitted into the interior of the cylinder of the distributer through a branch 19 establishing communication with a water supply.

The special valve (Figs. 3–7) is constituted by upper and lower disk-like parts or heads 21, 20 connected and braced by a tubular, axial neck. The passage or bore of said neck opens at its opposite ends into diametric, horizontal passages provided in the parts 21, 20, the whole forming a system of three conduits in the shape of a double T. Fig. 3 shows the arrangement of the conduits; the upper head 21 is provided with openings 23, extending inward from its peripheral wall and visible in Figs. 4 and 5.

The lower head 20 is provided with two circular openings 22 spaced from its peripheral wall, as shown in Figs. 4 and 7. Fig. 6 shows the cross-sectional shape of the vertical or connecting conduit.

The circular openings 22 provided in the lower valve head 20, as well as the openings 23 provided in the upper valve head 21, have for their object to put under pressure and in communication all the faces of the valve with the covers of the cylinder. By this means the valve is flooded and perfectly balanced in every direction.

The valve is a rotary one, provided with a rod 24 and a counter-rod 25 passing through the covers 17 and 18; a tight joint is insured by stuffing boxes 26 and 27. The operation takes place by means of a hand wheel 28.

The valve rod is provided with a needle indicating on a fixed dial the various positions of the apparatus.

The working of the apparatus is as follows:

*Admission to the top part of the hydraulic press cylinder.*

In the position shown in Fig. 2, the accumulator, always in communication with the cylinder *a* of the distributer, supplies the compartments 51 and 52 of the inner top conduit 11.

These two compartments in communication with the outer top conduit 10, are therefore in communication with the top part of the press cylinder through the branch 14.

It will be shown that simultaneously the bottom part of the press cylinder is open to exhaust.

*Exhaust at the bottom part of the hydraulic press cylinder.*

It will be seen in Fig. 1 that the bottom part of the press cylinder is always in communication through the branch 15 with the intermediate conduit 12, and the latter, through the vertical conduits, is in communication with the compartments 53 and 54 of the inner top conduit 11. It will be seen that in the position illustrated in this figure, the compartments 53 and 54 of the conduit 11 are in communication with the three conduits of the rotary valve. Water passing through the valve passes through the bottom conduit 13 and is in communication with the suction side of the pump through the branch 16. By operating the hand wheel to one eighth of a turn, the openings 23 as well as the vertical conduits of the valve will be closed owing to their coming opposite solid portions of the cylinder, and the distributer will be at the dead point.

If the operation of the distributer is continued for another fraction of a turn, always equal to one eighth, in the same direction (see Fig. 1), the openings 23 of the valve will again aline with the cylinder openings, but in a reverse position to the first one.

Admission will take place at the bottom part of the press cylinder, while the top part will be open to exhaust.

Another eighth of a turn of the control hand wheel will bring the distributer back to the dead point, then the operations will continue *ad infinitum* in the same order.

I claim as my invention:—

1. A balanced distributer for hydraulic presses and the like, comprising a cylinder provided with a plurality of circular conduits, and with longitudinal conduits connecting certain of said circular conduits; a rotary valve arranged in said cylinder and having chambers for the fluid above and below its ends, to cause longitudinal balancing of the valve; said valve being provided with a system of internal conduits arranged in opposition relatively to those of the cylinders; and means for producing rotation of said valve.

2. A balanced distributer for hydraulic presses and the like comprising a cylinder provided with four circular conduits, one of which is divided into four compartments communicating with the interior of the cylinder; said conduits being in communication with the two chambers of the press, the accumulator and the pump; a longitudinally balanced rotary valve in the said cylinder; the said valve having a system of three internal conduits forming a double T; and a hand wheel for producing rotation of the valve.

3. A balanced distributer for hydraulic presses and the like, comprising a cylinder provided with four circular conduits, one divided into four compartments communicating with the interior of the cylinder; said conduits being in communication with the two chambers of the press, the accumulator and the pump; a longitudinally balanced, rotary valve in said cylinder to control the passage of the fluid through said conduits; and means for rotating said valve.

4. A balanced distributer for hydraulic presses and the like, comprising a cylinder provided with four circular conduits, one divided into four compartments communicating with the interior of the cylinder; said conduits being in communication with the two chambers of the press, the accumulator and the pump; a longitudinally balanced, rotary valve in said cylinder to control the passage of the fluid through said conduits; said valve being provided with a system of internal conduits, and having chambers for the fluid above and below its ends to cause longitudinal balancing of the valve; and means for rotating said valve.

5. A balanced distributer for hydraulic presses and the like, comprising a cylinder provided with four circular conduits, one divided into four compartments communicating with the interior of the cylinder; said conduits being in communication with the two chambers of the press, the accumulator and the pump; a longitudinally balanced, rotary valve in said cylinder to control the passage of the fluid through said conduits; said valve being provided with a system of three internal conduits forming a double T, and having chambers for the fluid above and below its ends to cause longitudinal balancing of the valve; and means for rotating said valve.

In testimony whereof I affix my signature.

GABRIEL GOMAND.

Copies of this patent may be obtained for five cents each, by addressing the "Commissioner of Patents, Washington, D. C."